United States Patent [19]

Tradewell et al.

[11] 4,444,574

[45] Apr. 24, 1984

[54] PARTIALLY-CARBONIZED POLYACRYLONITRILE FILTER

[76] Inventors: George Tradewell, Rte. 903, Jim Thorpe, Pa. 18229; W. Novis Smith, 135 S. 18th St., Philadelphia, Pa. 19103

[21] Appl. No.: 433,154

[22] Filed: Oct. 6, 1982

[51] Int. Cl.$^3$ .............................................. B01D 46/04
[52] U.S. Cl. ............................................ 55/96; 55/97; 55/381; 55/524; 55/527; 55/528; 55/DIG. 30; 428/367; 428/408
[58] Field of Search ................. 55/381, 382, 527, 528, 55/387, 524, 316, 97, 96, DIG. 30; 428/408, 367; 8/115.5; 423/447.1, 447.2, 447.6

[56] References Cited

U.S. PATENT DOCUMENTS

| | | | |
|---|---|---|---|
| Re. 30,414 | 10/1980 | Kinoshita | 423/447.6 |
| 4,029,955 | 6/1977 | Tart | 55/522 |
| 4,046,525 | 9/1977 | Matsuo et al. | 55/387 |
| 4,169,911 | 10/1979 | Yoshida et al. | 428/408 |
| 4,181,513 | 1/1980 | Fukada et al. | 55/527 |
| 4,259,397 | 3/1981 | Saito et al. | 428/408 |
| 4,285,831 | 8/1981 | Yoshida et al. | 428/367 |
| 4,370,376 | 1/1983 | Gansal et al. | 55/527 |
| 4,401,588 | 8/1983 | Turner | 423/447.1 |

*Primary Examiner*—Bernard Nozick
*Attorney, Agent, or Firm*—Steele, Gould & Fried

[57] ABSTRACT

A filter for extracting solids and liquids from gaseous combustion exhausts comprises a textile filter element formed of polyacrylonitrile fibers oxidized by careful heat treatment and comprising approximately 61% carbon after treatment. The filter may be woven, knitted or formed as a batting of randomly-oriented fibers. Abrasion resistant coatings and lubricants for the fibers are disclosed. The filter material is especially useful as a filter bag.

13 Claims, No Drawings

PARTIALLY-CARBONIZED POLYACRYLONITRILE FILTER

BACKGROUND OF THE INVENTION

1. Field of the Invention

This invention relates to the field of textile filter materials, and in particular to filter bags for removing corrosive liquid and solid contaminants from gaseous combustion exhaust.

2. Description of the Prior Art

Carbonized fabrics are known to be useful in a variety of applications requiring chemical and corrosion resistance. Suitable carbon fibers are made from pitch or other staple carbon sources, or can be prepared by thermal carbonization of synthetic fibers such as rayon, nylon, polyacrylonitrile (such as "Orlon"), or the like.

In preparing carbonized fibers from polyacrylonitrile, the fibers are slowly heated to approximately 250°–300° C. in air, at which controlled thermal oxidation and chemical transformation occurs. The fibers are held in this approximate temperature range (250°–300° C. or 480°–570° F.) for some minutes. In its oxidized and converted state, the fiber, now turned black, contains approximately 61% carbon. In this condition, the fiber is known as "oxidized polyacrylonitrile fiber" and is abbreviated "OPF".

Oxidized polyacrylonitrile is known in the art as a heat resistant fiber. Fabric of the material is particularly adapted to uses formerly reserved for asbestos. In particular, industrial and military protective and flame resistant clothing, flame resistant vehicle interior materials, electrical cable braiding and the like are examples of preferred uses for oxidized polyacrylonitrile. The material does not burn and is suitably flexible in a fabric for these uses.

Notwithstanding the foregoing uses as a flame retardant and heat resistant material, in order to provide chemically resistant fabrics for combustion exhaust filters and other corrosive environments, the prior art has gone one step further with carbon-containing materials such as oxidized polyacrylonitrile, in order to fully carbonize the fibers. Using further thermal pyrolysis at higher temperatures, OPF fibers are commonly "fully" carbonized into fibers containing at least 95% carbon. Although carbon fibers of this type are chemically resistant, the fibers are brittle and prone to deteriorate if flexed, abraded or otherwise stressed. These fibers are frequently used as filter elements and the like, both in activated and unactivated carbon states.

The present invention concerns the use of a precursor to the prior art's 95% carbon filaments, namely, the aforesaid oxidized polyacrylonitrile fiber, comprising approximately 61% carbon. The precursor material is preferably woven or knitted to form a filter bag through which combustion exhaust is passed, and upon which pollutants accumulate. The filter bag is strong and flexible, and may be periodically cleaned by automatic machinery as known in the art. The filter is resistant to chemical attack by sulfuric acid, hydrofluoric acid and other chemicals found in combustion exhaust application. The partial carbonization of the polyacrylonitrile fiber is found to provide adequate resistance to chemical deterioration due to abrasive and corrosive compounds and conditions found in combustion exhaust. To improve useful life, abrasion resistant coatings and lubricants can be applied to increase the mechanical strength of the fabric.

SUMMARY OF THE INVENTION

It is an object of this invention to provide an inexpensive and effective filter material for the hot and corrosive environment of combustion exhaust.

It is also an object of this invention to gain the corrosion resistance of carbonized fiber so far as possible without the inherent weaknesses, higher cost and mechanical drawbacks of fully carbonized materials.

It is another object of the invention to improve the useful lifetime of filter material.

It is yet another object of the invention to provide a filter material which is versatile and effective in a wide range of applications.

It is yet another object of the invention to provide a filter bag capable of long service removing abrasive and corrosive materials from combustion exhausts.

These and other objects are accomplished by a filter for extracting solids and condensing liquids from gaseous combustion exhausts comprising a textile filter formed of polyacrylonitrile fibers oxidized in a controlled manner and having approximately 61% carbon. The filter may woven, knitted or formed as a batting of randomly oriented fibers. Abrasion resistant coatings and lubricants are disclosed. The filter material is especially useful as a filter bag.

DETAILED DESCRIPTION OF THE PREFERRED EMBODIMENTS

The filter material of the invention is formed of a material which would otherwise be regarded as merely a precursor to the known product useful in filters, namely, fully carbonized fabric. Fully carbonized (i.e., that having at least 95% carbon) fibers are quite resistant to deterioration due to the effects of acid and heat. Inasmuch as combustion exhaust, for example the exhaust of a coal burning power plant, is both hot and corrosive, carbonized fibers are particularly useful.

The present invention stops short of fully-carbonized fibers which are very stiff and lack any abrasion resistance. Instead, the lower cost precursor material (OPF) is used in order to secure additional abrasion resistance and flexibility which is especially useful in a filter bag for use as a combustion exhaust filter. According to the invention, an inexpensive and long-lived filter bag or filter fabric is made from partially carbonized or "oxidized" polyacrylonitrile fabric.

Filter bags according to the invention are mounted such that the exhaust of a combustion process passes through the bag, pollutants and solid contaminants being screened out by the bag and captured. Particles of soot and ash are trapped in the fiber of the bag. Moreover, the filter may be operated at the dew point such that water and sulfuric acid in the exhaust can be condensed on the filter bag, without damage to the bag, due to the preoxidation/cabonization steps in the making thereof. The filter is strong and flexible, being easily agitated or washed clean, and put back into full service automatically.

Rather than employing 95% carbonized fabric for filter bags, the preoxidized precursor to such material is employed, whereby the resulting filter material is sufficiently flexible to facilitate cleaning and removal of trapped particles and materials, yet is sufficiently inert to withstand the rough treatment, heat and corrosive chemicals encountered.

Removal of particles is commonly accomplished by vibrating the filter material when positioned on line, or by periodically removing the filter from the exhaust path for rinsing, shaking or otherwise cleaning. Fabric of OPF can survive substantially rougher handling than the more brittle fabric made from fully carbonized synthetic fibers.

In order to prepare a suitable filter bag, polyacrylonitrile fibers (e.g., "Orlon") and preferably fed from handling units to tensioning devices, forming a tow having a plurality uniform bands. The two can be hot stretched if desired.

The bands of fibers are fed from a creel and routed through a heated oven by means of roller drives on opposite sides of the oven at progressively higher levels, the bands passing across the oven repeatedly and progressing, for example, from bottom to top. The oven temperature is maintained at approximately 250° C. (480° F.) and the bands pass slowly through the heated area until the polyacrylonitrile is oxidized to approximately 61% carbon, the remainder being mostly oxygen and nitrogen. The process takes a few hours at the preferred temperature of 250° C. Rather than completing oxidation, for example by further higher temperature treatment in an inert gas atmosphere, the oxidized polyacrylonitrile fiber or "OPF" is ready to be woven, knitted, formed into a batt, or otherwise processed into a filter element.

The oxidized polyacrylonitrile fibers can be treated like the precursor "Orlon" fibers from which they were generated. For the particular application of filter material, it is preferred that a fabric be woven or knitted and the yarns thereof may be filament or spun. Each filament is preferably approximately 8 micrometers in diameter. A basket weave, plain weave or any of the conventional knits are appropriate to form a relatively thick but flexible material quite suitable for application as a filter bag. For certain uses, up to thirty-five percent of an aramid (e.g., that known as "Nomex") may be blended in the yarn to improve abrasion resistance.

It is presently preferred that the filter bag material be further treated with a coating to improve the abrasion resistance. Although coatings will somewhat stiffen the filter material, the material is thereby made substantially more durable and long-lived. Suitable abrasion resistant coatings include polyimide, melamine, silicones or PTFE, and resins which are applied as known in the art.

The resulting fabric, although having substantially less carbon concentration than previous filter materials, functions very well as a filter bag or similar filtration unit. The material will operate nicely (and not become brittle) at service temperatures up to approximately 150° C. (300° F.) in industrial applications such as smoke stack filters. At higher temperatures the material slowly oxidizes in air (and at even higher temperature carbonizes). The OPF filter fabric is expected to survive a typical combustion exhaust filtration system for at least a year before becoming unfit for use.

Although operation at the dew point in such industrial applications frequently condenses sulfuric acid, sulfur dioxide and other corrosive substances on the filter material, the present filter material is resistant to degradation by acid and heat in these conditions. The combination of corrosion and chemical resistance, heat stability and flexibility make the fabric unparalleled as a filter bag for combustion exhausts.

As is conventional with other materials, a filter bag in the form of an elongated tube, for example several centimeters to a meter in diameter and up to several meters long, is closed at one end. The tube may be knitted, woven or formed from a batt of randomly-oriented fibers, and seamed closed at the end. A plurality of filter elements formed by such tubes may be mounted as known in the art to be periodically agitated, loosening accumulations of ash, soot and liquid pollutants to fall back into a smokestack or accumulator. Alternatively, a carousel arrangement can be used to dispose some tubes in service while others are held aside to be cleaned by any appropriate means.

Carbonization of polyacrylonitrile to about 61% carbon is perfectly adequate for the smoke stack application, the fabric being heat and flame resistant, and chemically inert. The carbon is not activated like charcoal, whereby the fabric is chemically resistant. Without losing chemical inertness, abrasion resistant coatings and lubricants such as silicones, melamines and polyimides are applied to the fibers before weaving, knitting or batting.

The mechanical strength of the filter material can be improved further by incorporating an additional, preferably corrosion resistant yarn into the weave or knit, or by attaching a non-woven batt to an appropriate backing. In one embodiment of the invention an aramid fiber, for example that known as "Nomex", is blended into the yarn to a proportion of about 90% oxidized polyacrylonitrile and 10% aramid. This fabric is somewhat stiffer than pure OPF, but is also more abrasion resistant. Other blends or coatings as known in the art will improve abrasion resistance, or seal the material against further oxidation. Even with a suitable coating added, the OPF filter material is substantially less expensive than fully-carbonized materials heretofore used in such environments.

Variations on the inventive concept will be apparent to persons skilled in the art, in light of this disclosure. Reference should be made to the appended claims rather than the foregoing specification as indicating the true scope of the subject invention.

What is claimed is:

1. A method for filtering pollutants from combustion exhaust, comprising the steps of:
   placing a filter bag of polyacrylonitrile fibers, oxidized and carbonized to approximately 61% carbon, in a path defined by the exhaust, the exhaust passing through the filter bag, and periodically removing accumulation of pollutants from the filter bag.

2. The method of claim 1, wherein the filter bag is disposed at a point in the path defined by the dew point of a liquid pollutant contained in the exhaust, whereby the liquid condenses on the filter bag.

3. A filter for extracting solids and liquids from gaseous combustion exhaust, comprising a textile filter member formed of polyacrylonitrile fibers, partially and evenly oxidized to approximately 61% carbon by weight.

4. The filter of claim 1, wherein said filter member is knitted.

5. The filter of claim 1, wherein said filter member is formed from a non-woven batt of randomly-oriented fibers.

6. The filter of claim 1, further comprising an abrasion resistant coating chosen from the group silicone, melamine and polyimide resins.

7. The filter of claim 1, wherein said filter member is formed in the shape of a filter bag.

8. The filter of claim 3, wherein said textile filter member is formed of woven fibers.

9. The filter member of claim 8, wherein said filter member is woven in a basket weave from yarn strands in a plurality of plys, the plys having filaments approximately 8 to 10 micrometers in diameter.

10. The filter of claim 8, wherein said woven fibers are spun.

11. The filter of claim 8, wherein said woven fibers are continuous filament.

12. The filter of claim 3, further comprising aramid filaments blended into the oxidized polyacrylonitrile fibers.

13. The filter of claim 3, further comprising aramid fibers woven together with oxidized polyacrylonitrile fibers.

* * * * *

UNITED STATES PATENT AND TRADEMARK OFFICE
CERTIFICATE OF CORRECTION

PATENT NO. : 4,444,574
DATED : April 24, 1984
INVENTOR(S) : George Tradewell and W. Novis Smith It is certified that error appears in the above—identified patent and that said Letters Patent is hereby corrected as shown below:

In column 3, line 11, "two" should be --tow--.

Signed and Sealed this

Thirtieth Day of October 1984

[SEAL]

Attest:

GERALD J. MOSSINGHOFF

Attesting Officer      Commissioner of Patents and Trademarks